US009197317B2

(12) United States Patent
Motooka et al.

(10) Patent No.: US 9,197,317 B2
(45) Date of Patent: Nov. 24, 2015

(54) COMMUNICATION SYSTEM, AND COMMUNICATION DEVICE

(75) Inventors: Shigenori Motooka, Toyonaka (JP); Koji Ishio, Nishinomiya (JP); Takashi Matsutani, Yao (JP)

(73) Assignee: MegaChips Corporation, Osaka-shi (JP)

( * ) Notice: Subject to any disclaimer, the term of this patent is extended or adjusted under 35 U.S.C. 154(b) by 142 days.

(21) Appl. No.: 14/117,268

(22) PCT Filed: May 16, 2011

(86) PCT No.: PCT/JP2011/061175
§ 371 (c)(1),
(2), (4) Date: Nov. 12, 2013

(87) PCT Pub. No.: WO2012/157058
PCT Pub. Date: Nov. 22, 2012

(65) Prior Publication Data
US 2014/0154974 A1 Jun. 5, 2014

(51) Int. Cl.
*H04B 7/24* (2006.01)
*H04B 7/02* (2006.01)
(Continued)

(52) U.S. Cl.
CPC ............. *H04B 7/24* (2013.01); *G01D 4/004* (2013.01); *H04B 7/026* (2013.01); *H04B 7/04* (2013.01); *H04B 7/12* (2013.01); *Y02B 90/246* (2013.01); *Y04S 20/42* (2013.01)

(58) Field of Classification Search
CPC ..... H04W 88/06; H04W 36/14; H04W 48/18; H04W 76/02
USPC ............... 455/39, 41.2, 422.1, 434, 515, 517, 455/436, 500
See application file for complete search history.

(56) References Cited

U.S. PATENT DOCUMENTS

| 7,577,434 | B2* | 8/2009 | Nakano et al. | 455/436 |
| 8,239,569 | B2* | 8/2012 | Mirtorabi et al. | 709/238 |
| 2007/0207806 | A1* | 9/2007 | Shaheen | 455/436 |
| 2009/0003603 | A1* | 1/2009 | Wessel et al. | 380/255 |
| 2010/0177756 | A1* | 7/2010 | Choi et al. | 370/338 |

FOREIGN PATENT DOCUMENTS

| JP | 2003 224620 | 8/2003 |
| JP | 2003 283693 | 10/2003 |

(Continued)

OTHER PUBLICATIONS

International Search Report Issued Jun. 14, 2011 in PCT JP11/061175 Filed May 16, 2011.

(Continued)

*Primary Examiner* — Sonny Trinh
(74) *Attorney, Agent, or Firm* — Oblon, McClelland, Maier & Neustadt, L.L.P.

(57) ABSTRACT

A communication system includes information acquisition devices having facility information and an information collection device for collecting the facility information from the information acquisition devices. The information collection device requests the information acquisition devices to send the facility information by using the first communication unit and the second communication unit of the information collection device. Each of the information acquisition devices includes a communication scheme specifying section for specifying which one of the first communication unit and the second communication unit in each of the information acquisition devices has first received the request to send from the information collection device, and a communication control section for making a reply to the request to send by using the communication unit specified by the communication scheme specifying section.

11 Claims, 7 Drawing Sheets

(51) Int. Cl.
　　*H04B 7/04*　　(2006.01)
　　*H04B 7/12*　　(2006.01)
　　*G01D 4/00*　　(2006.01)

(56) References Cited

FOREIGN PATENT DOCUMENTS

| JP | 2004-228608 | 8/2004 |
|---|---|---|
| JP | 2006 186583 | 7/2006 |
| JP | 2008 244989 | 10/2008 |
| JP | 2009 278417 | 11/2009 |
| JP | 2010 220085 | 9/2010 |

OTHER PUBLICATIONS

Japanese Office Action Issued Aug. 6, 2013 in Japanese Patent Application No. 2010-100577.
International Preliminary Report on Patentability and Written Opinion issued Nov. 28, 2013, in International application No. PCT/JP2011/061175 (with English translation).
Japanese Office Action issued Feb. 12, 2014, in Japan Patent Application No. 2010-100577 (with English translation).

* cited by examiner

F I G . 1
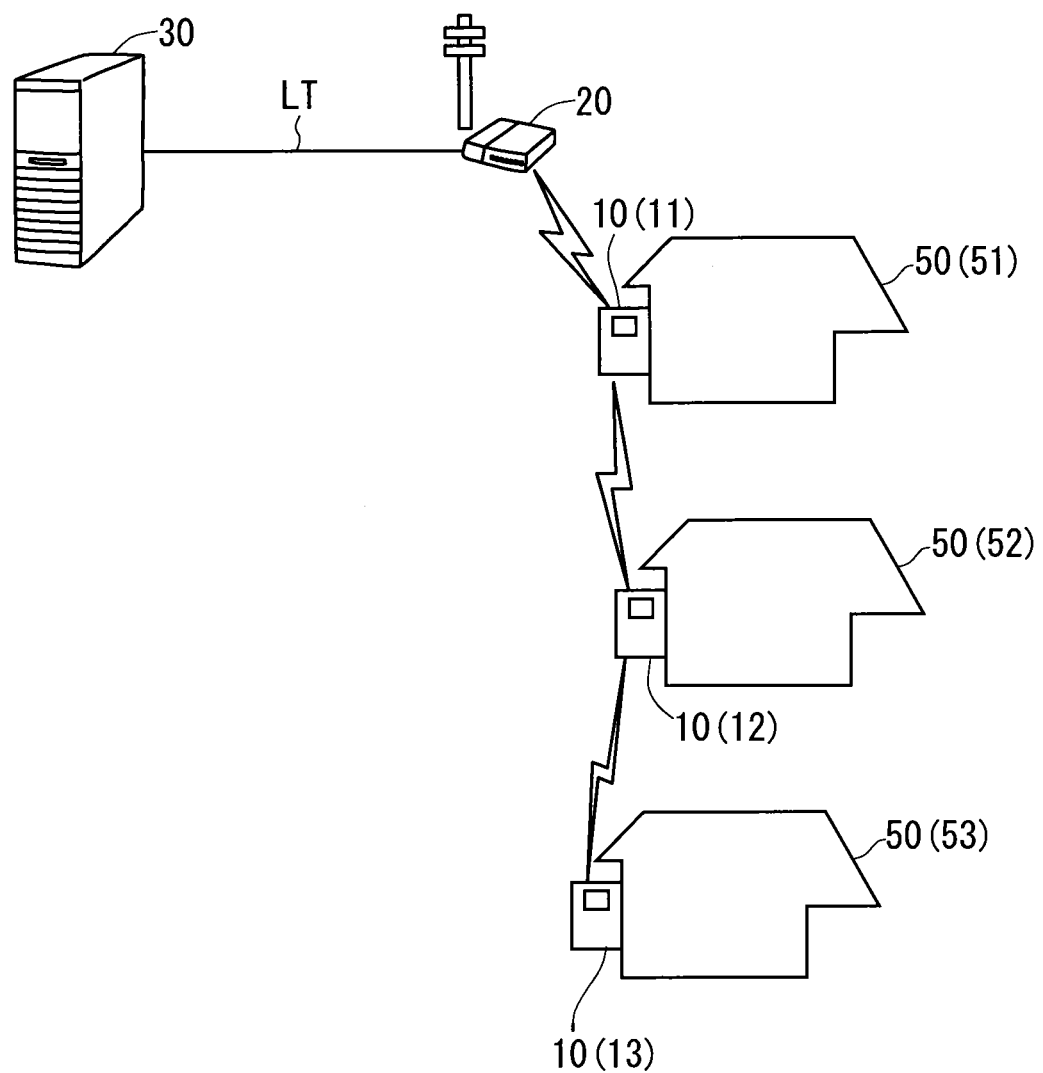

F I G . 1 0
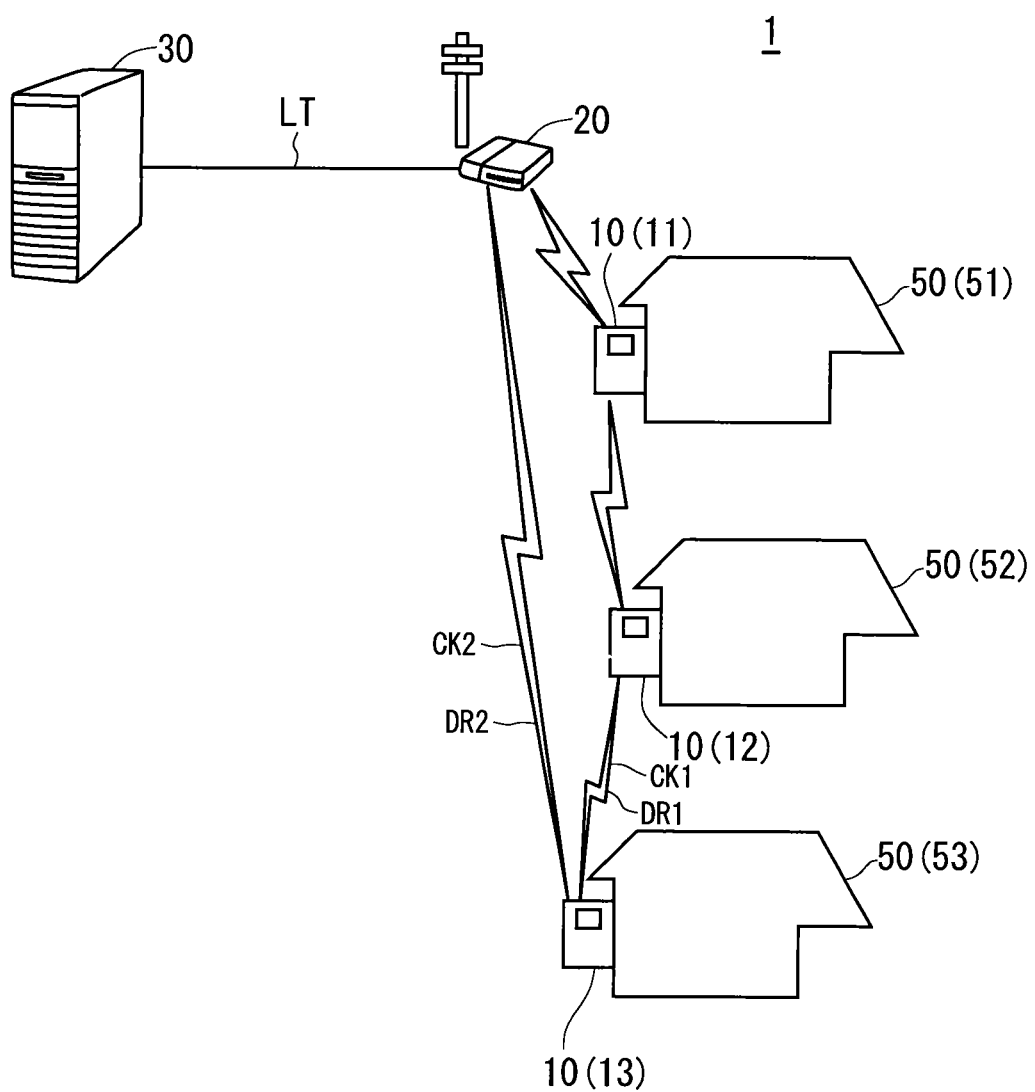

COMMUNICATION SYSTEM, AND COMMUNICATION DEVICE

TECHNICAL FIELD

The present invention relates to a communication technique.

BACKGROUND ART

Conventionally, there are communication systems which use radio communication to perform communication between devices or between apparatuses.

For example, a communication system which uses wire communication and radio communication to transmit information possessed by a second communication device from the second communication device to a first communication device is proposed in Patent Literature 1.

CITATION LIST

Patent Literature

Patent Literature 1: Japanese Patent Application Laid-Open No. 2009-278417

SUMMARY OF INVENTION

Technical Problem

The radio communication is communication which uses radio waves as a transmission medium. There is hence a likelihood that communication cannot be performed in accordance with communication conditions including a distance between devices or between apparatuses, environments and the like, depending on radio waves for use in the radio communication.

It is therefore an object of the present invention to provide a technique capable of improving the reliability of radio communication.

Solution to Problem

To solve the aforementioned problem, a communication system according to a first aspect of the present invention comprises: at least one first communication device having predetermined information; and a second communication device for collecting said predetermined information from said at least one first communication device, each of said at least one first communication device and said second communication device including a first communication means for performing radio communication, and a second communication means for performing radio communication using a radio signal different in frequency band from that used by the radio communication performed by said first communication means, said second communication device requesting said at least one first communication device to send said predetermined information by using said first communication means and said second communication means of said second communication device, said at least one first communication device including a specifying means for specifying which one of the first communication means and the second communication means in said at least one first communication device has first received said request to send, and a communication control means for making a reply to said request to send by using the communication means specified by said specifying means.

According to a second aspect of the present invention, in the communication system of the first aspect, said at least one first communication device includes a plurality of first communication devices, and, upon receipt of said request to send, said at least one first communication device relays said request to send by using said first communication means and said second communication means of said at least one first communication device.

According to a third aspect of the present invention, in the communication system of the second aspect, when relaying send data including said request to send, said at least one first communication device records the communication means specified by said specifying means and the relay of said at least one first communication device as transmission channel information of said send data in said send data, and said communication system transmits reply data in response to said request to send to said second communication device through a transmission channel determined based on said transmission channel information.

According to a fourth aspect of the present invention, in the communication system of the third aspect, when generating said reply data, said at least one first communication device records transmission channel information of the reply data in the reply data, based on the transmission channel information of said send data, and said communication system transmits said reply data to said second communication device through a transmission channel that is the reverse to the transmission channel of said send data in accordance with the transmission channel information of said reply data.

According to a fifth aspect of the present invention, in the communication system of any one of the first to fourth aspects, said first communication means and said second communication means in each of said at least one first communication device and said second communication device perform radio communication using modulation schemes different from each other.

A communication device according to an aspect of the present invention comprises: a first communication means performing radio communication; a second communication means for performing radio communication using a radio wave different in frequency band from that used by the radio communication performed by said first communication means; a specifying means for specifying which one of said first communication means and said second communication means has first received a request to send predetermined information from another communication device; and a communication control means for making a reply to said request to send by using the communication means specified by said specifying means.

Advantageous Effects of Invention

According to the present invention, an improvement in the reliability of radio communication is achieved.

These and other objects, features, aspects and advantages of the present invention will become more apparent from the following detailed description of the present invention when taken in conjunction with the accompanying drawings.

BRIEF DESCRIPTION OF DRAWINGS

FIG. 1 shows a configuration of a communication system according to an embodiment.

FIG. 10 illustrates the overall operation of the communication system.

DESCRIPTION OF EMBODIMENTS

Figure 2:
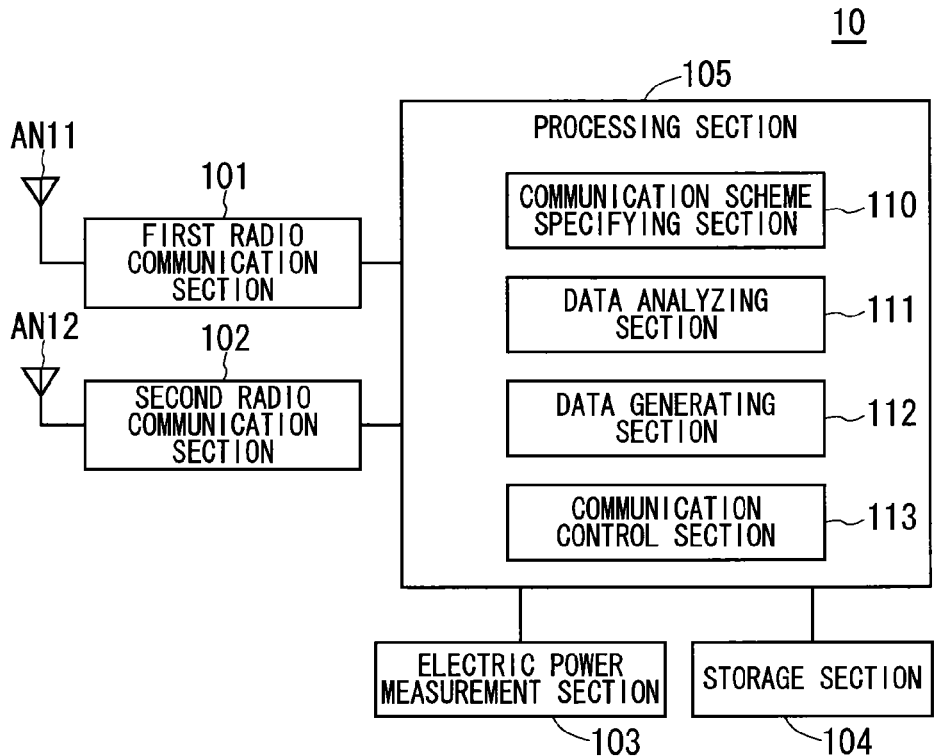
FIG. 2 is a block diagram showing a configuration of an information acquisition device.

An embodiment will be described with reference to the drawings.

Embodiment

Summary

FIG. 1 shows a configuration of a communication system 1 according to the embodiment.

As shown in FIG. 1, the communication system 1 includes a plurality of information acquisition devices (first communication devices) 10, an information collection device (a second communication device) 20 for collecting information acquired by the information acquisition devices 10, and a center device 30 connected through an optical fiber LT to the information collection device 20.

Each of the information acquisition devices 10 is provided in a certain facility 50, and acquires information (facility information) on the facility. In FIG. 1, each of the information acquisition devices 10 is shown as provided in a home serving as the certain facility 50. Each of the information acquisition devices 10 functions as an electric energy meter (an electricity meter) for measuring the electric power consumed in the home, for example, to acquire the amount of power consumption as the facility information. It should be noted that each information acquisition device 10 may be a gas meter for measuring the amount of gas usage. When each of the information acquisition devices 10 functions as a gas meter, the amount of gas usage is acquired as the facility information.

The information collection device 20 is installed on a utility pole and the like, and has the function of collecting the facility information acquired by the information acquisition devices 10.

Specifically, the information collection device 20 uses radio communication to request each of the information acquisition devices 10 included in the communication system 1 to send the facility information. Upon receipt of the request to send the facility information, each of the information acquisition devices 10 sends the facility information in response to the request to send.

Each of the information acquisition devices 10 also has a function (a multi-hop communication function) as a relay device for relaying received information. The communication for collecting the facility information in the communication system 1 is performed also via the information acquisition devices 10 serving as the relay devices.

In FIG. 1, for example, the facility information acquired by an information acquisition device 12 for a facility 52 is shown as collected through a path including an information acquisition device 11 for a facility 51 as a relay device. Also, in FIG. 1, the facility information acquired by an information acquisition device 13 for a facility 53 is shown as collected through a path including the information acquisition device 11 for the facility 51 and the information acquisition device 12 for the facility 52 as relay devices.

The information collection device 20 transmits the facility information collected from each of the information acquisition devices 10 to the center device 30 via optical communication using the optical fiber LT serving as a transmission medium.

[Specific Configuration]

The configuration of the information acquisition devices 10 will be described. FIG. 2 is a block diagram showing a configuration of such an information acquisition device 10.

As shown in FIG. 2, the information acquisition device 10 includes a first radio communication section 101 connected to an antenna element AN11, a second radio communication section 102 connected to an antenna element AN12, an electric power measurement section 103, a storage section 104, and a processing section 105.

The first radio communication section 101 functions as a radio communication means in cooperation with the antenna element AN11. Specifically, the first radio communication section 101 acquires data (reception data) from a signal received by the antenna element AN11 to output the data to the processing section 105. The first radio communication section 101 also wirelessly sends a signal (a send signal) including send data inputted from the processing section 105 via the antenna element AN11.

Like the aforementioned first radio communication section 101, the second radio communication section 102 functions as a radio communication means in cooperation with the antenna element AN12. Specifically, the second radio communication section 102 acquires data (reception data) from a signal received by the antenna element AN12 to output the data to the processing section 105, and wirelessly sends a signal including send data inputted from the processing section 105 via the antenna element AN12.

The first radio communication section 101 and the second radio communication section 102 use radio signals different in frequency band from each other to perform radio communication. Specifically, the first radio communication section 101 uses a radio signal in a frequency band with a center frequency at 950 MHz, for example, to perform radio communication, whereas the second radio communication section 102 uses a radio signal in a frequency band with a center frequency at 430 MHz to perform radio communication. In this manner, the information acquisition device 10 according to the present embodiment uses two radio waves in frequency bands different from each other to perform radio communication. A radio wave, as used herein, refers to a modulated radio wave such that a data signal is placed on a carrier wave.

The center frequency used herein refers to one-half of the sum of the highest frequency and the lowest frequency of radio signals used for radio communication, that is, the median value of the highest frequency and the lowest frequency.

The electric power measurement section 103 includes a measuring instrument for measuring power consumption, and outputs the amount of electric power (the amount of power consumption) obtained by adding up the measured power consumptions to the processing section 105.

The storage section 104 includes one or more various storage devices such as a RAM (Random Access Memory), a rewritable nonvolatile memory (EPROM (Erasable Programmable ROM) and the like), and a hard disk device, for example. The storage section 104 stores programs to be executed by the processing section 105 therein, and provides a working area for execution of programs therein.

The storage section 104 is also capable of storing various pieces of information, data and the like, and may store the amount of power consumption inputted from the electric power measurement section 103, for example.

The processing section 105 is connected to the first radio communication section 101, the second radio communication section 102, the electric power measurement section 103 and the storage section 104, and controls the overall operations of the information acquisition device 10.

An instance where various processes to be performed by the processing section 105 are implemented by software is illustrated herein. In this instance, the processing section 105 includes a microcomputer, for example. The microcomputer reads and executes programs stored in the storage section 104 to implement various functions.

Specifically, as shown in FIG. 2, the processing section 105 executes the aforementioned programs to functionally implement a communication scheme specifying section 110, a data analyzing section 111, a data generating section 112, and a communication control section 113.

The communication scheme specifying section 110 specifies the communication scheme used for the transmission of reception data, based on from which communication section, the first radio communication section 101 or the second radio communication section 102, the reception data is inputted.

The data analyzing section 111 analyzes the reception data inputted from the first radio communication section 101 and the second radio communication section 102.

The data generating section 112 generates the send data in the form of packets to be wirelessly sent to the outside by using the radio communication means.

The communication control section 113 controls the operations for radio communication using the radio communication means.

Part or all of the aforementioned functional sections implemented by the processing section 105 may be implemented by hardware.

Figure 3:
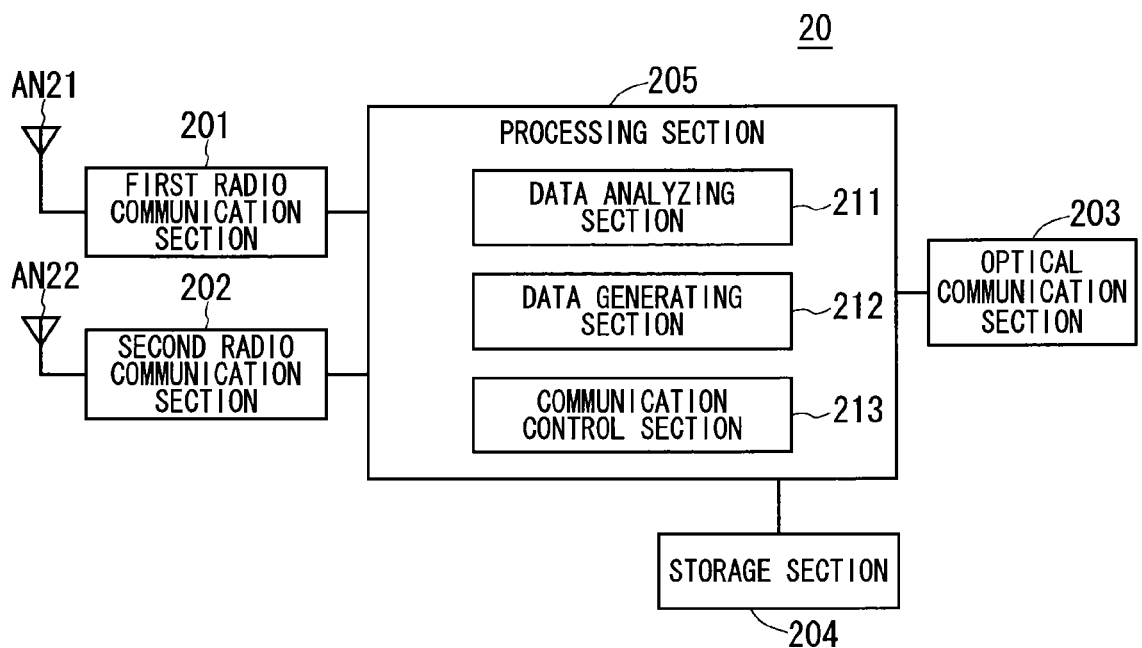
FIG. 3 is block diagram showing a configuration of an information collection device.

Next, the configuration of the information collection device 20 will be described. FIG. 3 is a block diagram showing a configuration of the information collection device 20.

As shown in FIG. 3, the information collection device 20 includes a first radio communication section 201 connected to an antenna element AN21, a second radio communication section 202 connected to an antenna element AN22, an optical communication section 203, a storage section 204, and a processing section 205.

The first radio communication section 201 functions as a radio communication means in cooperation with the antenna element AN21. Specifically, the first radio communication section 201 acquires data (reception data) from a signal received by the antenna element AN21 to output the data to the processing section 205. The first radio communication section 201 also wirelessly sends a send signal including send data inputted from the processing section 205 via the antenna element AN21.

Like the aforementioned first radio communication section 201, the second radio communication section 202 functions as a radio communication means in cooperation with the antenna element AN22. Specifically, the second radio communication section 202 acquires reception data from a signal received by the antenna element AN22 to output the reception data to the processing section 205, and wirelessly sends a signal including send data inputted from the processing section 205 via the antenna element AN22.

The first radio communication section 201 and the second radio communication section 202 use radio signals different in frequency band from each other to perform radio communication. Specifically, the first radio communication section 201 uses a radio signal in a frequency band with a center frequency at 950 MHz, for example, to perform radio communication, whereas the second radio communication section 202 uses a radio signal in a frequency band with a center frequency at 430 MHz to perform radio communication. In this manner, the information collection device 20 according to the present embodiment uses two radio waves in frequency bands different from each other to perform radio communication.

The optical communication section 203 includes an interface (I/F) for performing optical communication through the optical fiber LT, and achieves communication between the information collection device 20 and the center device 30.

The storage section 204 includes one or more various storage devices such as a RAM (Random Access Memory), a rewritable nonvolatile memory (EPROM (Erasable Programmable ROM) and the like), and a hard disk device, for example. The storage section 204 stores programs to be executed by the processing section 205 therein, and provides a working area for execution of programs therein.

The storage section 204 is also capable of storing various pieces of information, data and the like, and may store the facility information collected from the information acquisition devices 10.

The processing section 205 is connected to the first radio communication section 201, the second radio communication section 202, the optical communication section 203 and the storage section 204, and controls the overall operations of the information collection device 20.

An instance where various processes to be performed by the processing section 205 are implemented by software is illustrated herein. In this instance, the processing section 205 includes a microcomputer, for example. The microcomputer reads and executes programs stored in the storage section 204 to implement various functions.

Specifically, as shown in FIG. 3, the processing section 205 executes the aforementioned programs to functionally implement a data analyzing section 211, a data generating section 212, and a communication control section 213. It should be noted that part or all of the aforementioned functional sections implemented by the processing section 205 may be implemented by hardware.

The data analyzing section 211 analyzes the data inputted to the information collection device 20. Specifically, the data analyzing section 211 analyzes the reception data inputted from the first radio communication section 201 and the second radio communication section 202, and the data inputted from the center device 30 via the optical communication section 203.

The data generating section 212 generates data to be outputted from the information collection device 20 to the outside. Specifically, the data generating section 212 generates the send data in the form of packets to be wirelessly sent to the outside by using the radio communication means. The send data generated in the data generating section 212 includes a request to send the facility information which is made to the information acquisition devices 10 included in the communication system 1. Also, the data generating section 212 generates data (facility data) including the facility information which is to be sent via the optical communication section 203 to the center device 30.

The communication control section 213 controls the operations for radio communication using the radio communication means. Specifically, the communication control section 213 outputs the send data including the requests to send, respectively, to the first radio communication section 201 and the second radio communication section 202 to thereby send the send data including the requests to send to the outside by using the two radio communication means. That is, the send data including the requests to send is outputted from the information collection device 20 by using a radio wave (referred to also as a "950-MHz radio wave" hereinafter) in a frequency band with a center frequency at 950 MHz and a radio wave (referred to also as a "430-MHz radio wave" hereinafter) in a frequency band with a center frequency at 430 MHz.

In this manner, the information collection device 20 sends the send data including the requests to send through two transmission channels to the information acquisition devices 10. It should be noted that a transmission channel as used in the present embodiment is a concept identified by a path between communication devices and a frequency used for radio communication. That is, transmission channels which are identical in path with reach other but different in frequency used for radio communication from each other are construed as different transmission channels.

Figure 4:
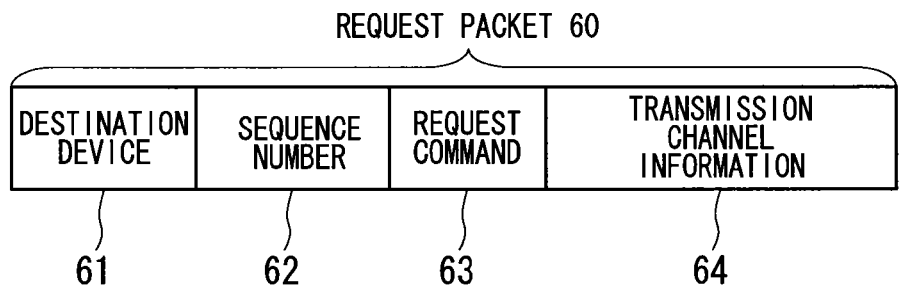
FIG. 4 is a diagram showing a request packet including a request to send facility information.
Figure 5:
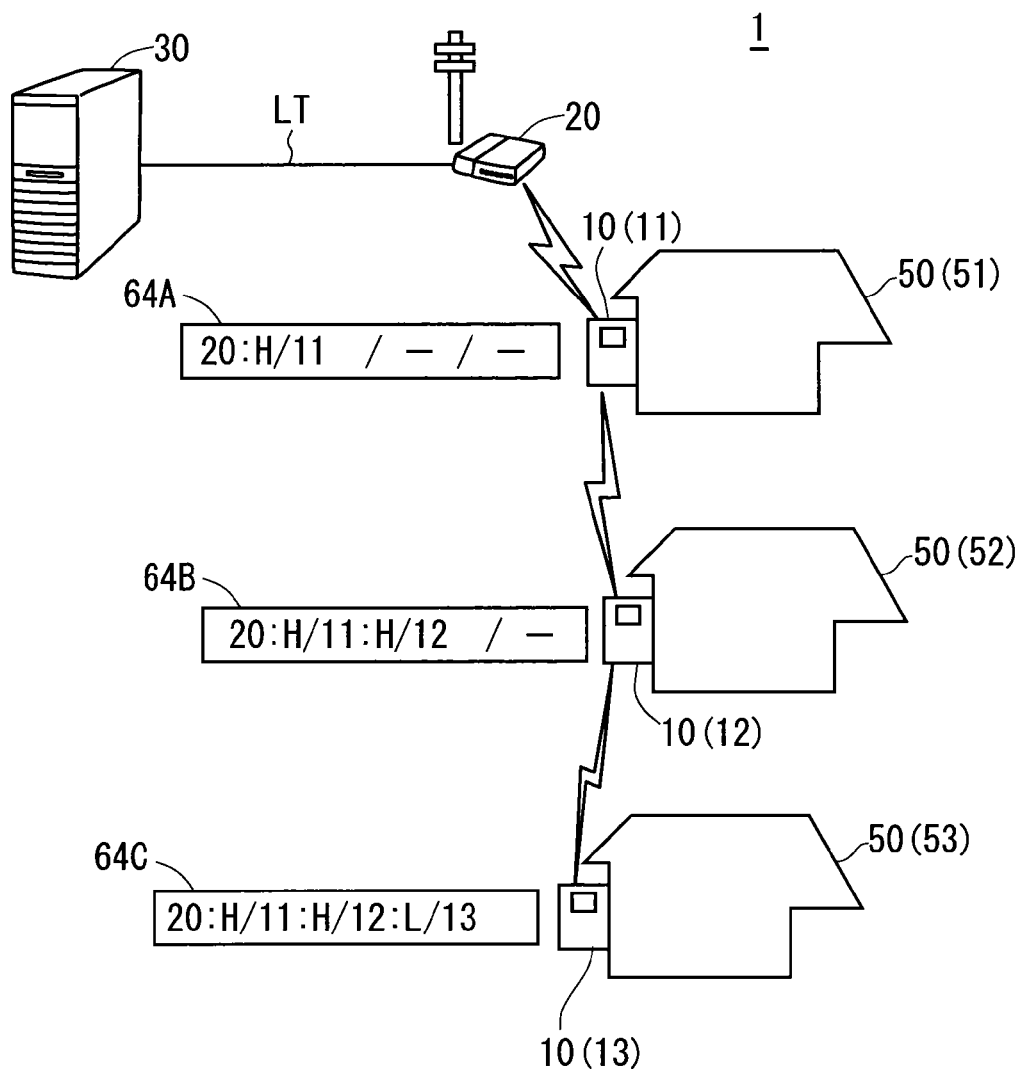
FIG. 5 shows how transmission channel information is recorded in the request packet.
Figure 6:
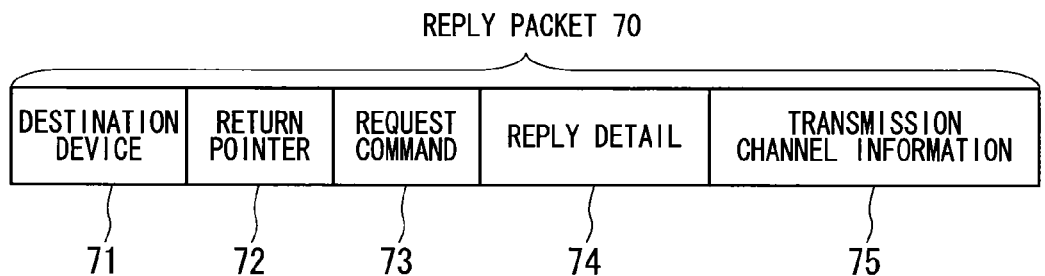
FIG. 6 is a diagram showing a reply packet to the request to send.

A packet for use in radio communication in the communication system 1 will be illustrated. FIG. 4 schematically shows an example of a request packet 60 for use in making a request to send the facility information from the information collection device 20 to each of the information acquisition devices 10. FIG. 5 shows how transmission channel information 64 is recorded in the request packet 60 generated in each of the information acquisition devices 10. FIG. 6 schematically shows an example of a reply packet 70 which each of the information acquisition devices 10 uses when making a reply to the aforementioned request to send.

The request packet 60 shown in FIG. 4 includes information 61, 62, 63 and 64. It should be noted that the illustration of FIG. 4 does not limit the description position and data length of the information 61, 62, 63 and 64 in the request packet 60.

The information 61 is information for specifying an information acquisition device 10 serving as a destination, and includes a description about identification information for discriminating between the information acquisition devices 10, for example. It is assumed herein that the request packet 60 is sent (broadcasted) to all of the information acquisition devices 10, and information indicating that all of the information acquisition devices 10 serve as destinations is described in the destination device information 61.

The information 62 is information for identifying the request packet 60, and includes a description about the sequence number of the request packet 60. The sequence number 62 is a number starting from 0 (zero), for example, and incremented each time a request packet is generated in the data generating section 212.

The information 63 is information about a process for which a request is made to the information acquisition devices 10. For example, a request command corresponding to the process for which the request is made is given as the information 63.

The information 64 is information (transmission channel information) about the transmission channel of the request packet 60 in the communication system 1. Each of the information acquisition devices 10 appends additional information to the transmission channel information when sending the request packet 60 (including resending performed by each information acquisition device 10 acting as a relay station). In the transmission channel information, discrimination between communication devices having sent the request packet 60 and discrimination between communication schemes are represented for each unit (for each transmission channel unit).

The transmission channel information 64 will be described in further detail. As to the transmission channel information, the discrimination between communication devices shall be represented by the reference numerals "20", "11", "12", "13" of the information collection device 20 and the information acquisition devices 10. For the discrimination between communication schemes, the communication using a radio wave at a frequency of 950 MHz shall be represented as "H", and the communication using a radio wave at a frequency of 430 MHz shall be represented as "L". The two aforementioned discrimination items shall be joined together using ":", and the transmission channel units shall be separated by "/".

In accordance with such representation rules, a transmission channel unit indicating the communication using a radio wave at a frequency of 950 MHz by means of the information acquisition device 11, for example, is represented as "11:H", and a transmission channel unit indicating the communication using a radio wave at a frequency of 430 MHz by means of the information acquisition device 12 is represented as "12:L".

When it is assumed in this case that the information acquisition device 11 in the example of FIG. 5 receives the request packet 60 via radio communication using a radio wave at a frequency of 950 MHz, transmission channel information 64A recorded in the information acquisition device 11 indicates "20:H/11". Then, when it is assumed that the request packet 60 is relayed from the information acquisition device 11 to the information acquisition device 12 via radio communication using a radio wave at a frequency of 950 MHz, transmission channel information 64B recorded in the information acquisition device 12 indicates "20:H/11:H/12". Further, when it is assumed that the request packet 60 is relayed from the information acquisition device 12 to the information acquisition device 13 via radio communication using a radio wave at a frequency of 430 MHz, transmission channel information 64C recorded in the information acquisition device 13 indicates "20:H/11:H/12:L/13".

In the communication system 1 according to the present embodiment, the request packet 60 shall be relayed a maximum of four times, and a maximum of four transmission channel units shall be recorded in the transmission channel information 64.

Next, the reply packet 70 will be described. The reply packet 70 illustrated in FIG. 6 includes information 71, 72, 73, 74 and 75. It should be noted that FIG. 6 does not show the description position and data length of the information 71, 72, 73, 74 and 75 in the reply packet 70.

Like the aforementioned information 61 (with reference to FIG. 4), the information 71 includes a description about destination device information. However, an information acquisition device 10 which is to receive the reply packet 70 next is identified in the reply packet 70, and the identification information (device number) of the information acquisition device 10 is described in the destination device information 71.

As will be described later, the reply packet 70 is sent backwardly along the transmission channel (referred to also as a "forward transmission channel") of the corresponding request packet 60 to the information collection device 20. At this time, a communication device (one of the information acquisition devices 10 or the information collection device 20) serving as the next destination in the transmission channel (referred to also as a "return transmission channel") followed by the reply packet 70 is specified by the information 72. The information 72 is a pointer for indicating the transmission channel described written in the transmission channel information 75 to be described below in accordance with a route, for example.

The information 73 is information about a request command similar to that of the aforementioned information 63 (with reference to FIG. 4). The same information as the request command 63 of the request packet 60 is described in the information 73.

The information 74 is information about the details of the reply, that is, facility information.

The information 75 is information about the return channel followed by the reply packet 70. An information acquisition device 10 serving as a source which sends the reply packet 70 generates the information 75, based on the transmission channel information 64 of the corresponding request packet 60. The transmission channel information 75 is generated, for example, by making a copy of the transmission channel information 64 of the request packet 60 except information about its own device or by making a copy of the aforementioned transmission channel units described in the transmission channel information 64 in reverse order except information about its own device. A representation method similar to that for the transmission channel information 64 for the forward channel shall be used for the transmission channel information 75 for the return channel.

In the case where the value "0" of the return pointer 72 is associated with the leading transmission channel unit in the transmission channel information 75, and the values "1", "2", ... of the return pointer 72 are associated with the second, third, and subsequent transmission channel units, respectively, counting from the leading one in the transmission channel information 75 in sequential order, the transmission channel units in the transmission channel information 75 are followed in sequential order by incrementing the value of the return pointer 72.

Additional information is not appended to the transmission channel information 75 by the information acquisition devices 10 in the return channel.

[Operation of Information Acquisition Device]

Communication for collecting the facility information in the communication system 1 includes: forward communication in which a request to send the facility information is transmitted from the information collection device 20 serving as a source to the information acquisition devices 10; and return communication in which the facility information acquired by the information acquisition devices 10 as a reply to the request to send is transmitted to the information collection device 20.

Figure 7:
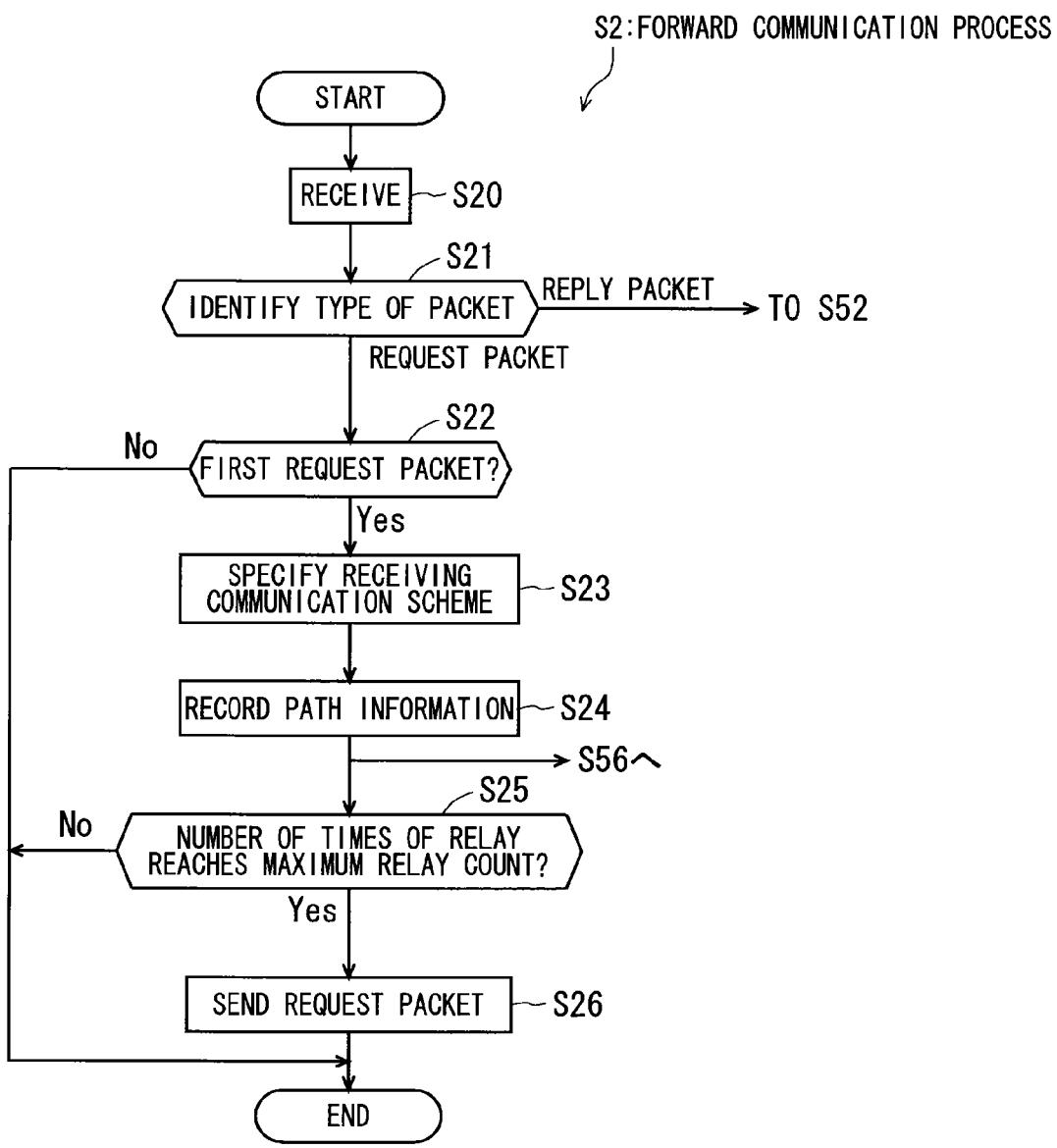
FIG. 7 is a flow diagram showing an operation of the information acquisition device for forward communication.

The operation of such an information acquisition device 10 for the forward communication, and the operation of the information acquisition device 10 for the return communication will be described hereinafter in this order. FIG. 7 is a flow diagram showing the operation of the information acquisition device 10 for the forward communication and, more specifically, a process (forward communication process) S2 performed in the case where the request packet 60 is received.

As shown in FIG. 7, after a radio wave is received in a step S20, the operating step proceeds to a step S21.

In the step S21, the data analyzing section 111 analyzes the reception data to identify the type of packet. Specifically, a judgment is made as to whether the received packet is the request packet 60 or the reply packet 70. When the received packet is the request packet 60, the operating step proceeds to a step S22. When the received packet is the reply packet 70, the operating step proceeds to a step S52. The operation performed when the received packet is the reply packet 70 will be described later.

In the next step S22, a judgment is made as to whether the request packet 60 is first received by the information acquisition device 10, based on the result of analysis in the data analyzing section 111. When it is not judged that the request packet 60 is first received, the communication control section 113 judges the process of relaying the received request packet 60 as being unnecessary to discard the request packet 60, thereby completing the forward communication process S2. On the other hand, when it is judged that the request packet 60 is first received, the operating step proceeds to a step S23.

The judgment step S22 is executable by making use of the sequence number 62 (with reference to FIG. 4) included in the request packet 60, for example. Specifically, when the request packet 60 is first received, the communication control section 113 records the sequence number 62 of the request packet as past data in the storage section 104. Then, when a new request packet 60 is received, the communication control section 113 checks the sequence number 62 of the received new request packet 60 against the past data about the sequence number 62 recorded in the storage section 104 to judge whether the new request packet 60 is first received or not.

According to such a judgment step S22, even when a plurality of request packets 60 including the same sequence number 62, i.e. a plurality of packets 60 having the same sending details (in this case, the same request details), are received, the process of relaying the request packet 60 received for the second time or later is canceled. Thus, the request packets 60 having the same sending details are prevented from being relayed (transferred) endlessly in the communication system 1. This prevents the increase in communication load on the communication system 1.

In the next step S23, the communication scheme specifying section 110 specifies the receiving communication scheme. Specifically, the communication scheme specifying section 110 specifies the communication scheme used for the transmission of the received request packet 60, based on from which communication section, the first radio communication section 101 or the second radio communication section 102, the received request packet 60 is inputted. For example, when the request packet 60 is inputted via the first radio communication section 101, the receiving communication scheme of the request packet 60 is specified as the radio communication using a radio wave at a frequency of 950 MHz. Also, when the request packet 60 is inputted via the second radio communication section 102, the receiving communication scheme of the request packet 60 is specified as the radio communication using a radio wave at a frequency of 430 MHz.

The step of specifying the communication scheme (the step S23) is a step executed after the judgment step S22 which excludes the request packet 60 which is not first received from packets to be relayed. For this reason, the communication scheme specified in the step S23 is the communication scheme of the transmission channel through which the request packet 60 is first transmitted to the information acquisition device 10. It may be said that the communication scheme of the transmission channel through which the request packet 60 is first transmitted to the information acquisition device 10 serving as its own device is a communication scheme (optimum communication scheme) that is optimum between the sender and its own device (the information acquisition device 10).

In the next step S24, the data generating section 112 appends the device number of the information acquisition device 10 and the communication scheme used for the transmission of the request packet 60 to the transmission channel information 64 of the request packet 60.

After the step S24 is completed, the operating step proceeds to steps S25 and S56. The step S56 will be described later as a step in the return communication process.

In the step S25, the communication control section 113 judges whether the number of times the received request packet 60 has been relayed (the number of relay stages) reaches a previously set maximum relay count or not, based on the result of analysis in the data analyzing section 111. When it is judged that the number of times the received request packet 60 has been relayed reaches the maximum relay count, the communication control section 113 discards the request packet 60 without performing the process of relaying the received request packet 60 to complete the forward communication process S2. On the other hand, when it is not judged that the number of times the received request packet 60 has been relayed reaches the maximum relay count, the operating step proceeds to a step S26.

The judgment as to whether the number of times the received request packet 60 has been relayed reaches the maximum relay count or not may be made, based on whether the transmission channel units corresponding to the maximum number of stages (in this case, four) have been recorded in the transmission channel information 64 included in the request packet 60 or not.

According to the judgment process in the step S25, the packets 60 having the same sending details (in this case, the same request details) are prevented from being relayed (transferred) excessively in the communication system 1. This prevents the increase in communication load on the communication system 1.

In the step S26, the communication control section 113 sends the request packet 60 having the transmission channel information 64 subjected to the appending process. The request packet 60 is sent using the first radio communication section 101 and the second radio communication section 102. In other words, the request packet 60 is sent using the 950-MHz radio wave and the 430-MHz radio wave.

For the forward communication, when receiving a request packet 60 which has not yet been received, the information acquisition device 10 appends additional information to the transmission channel information 64 of the request packet 60, and then sends the request packet 60 to be relayed by using two transmission channels in this manner.

Figure 8:
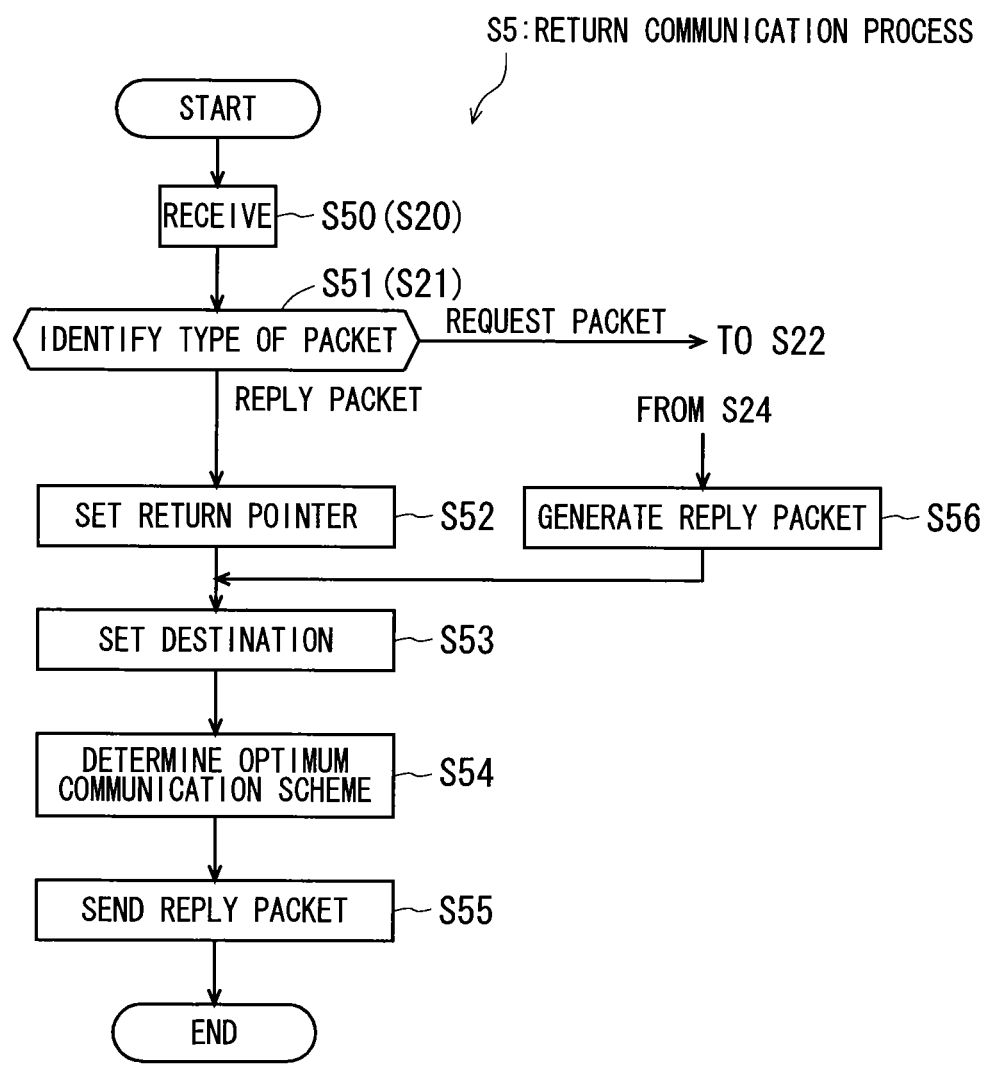
FIG. 8 is a flow diagram showing an operation of the information acquisition device for return communication.

Next, the operation of the information acquisition device 10 for the return communication will be described. FIG. 8 is a flow diagram showing the operation of the information acquisition device 10 for the return communication and, more specifically, a process (return communication process) S5 performed in the case where of sending the reply packet 70.

As shown in FIG. 8, after a radio wave is received in a step S50, the operating step proceeds to a step S51.

In the step S51, the data analyzing section 111 analyzes the reception data to judge the type of packet. When the received packet is the request packet 60, the operating step proceeds to the step S22 (with reference to FIG. 7). When the received packet is the reply packet 70, the operating step proceeds to the step S52. The operation performed when the received packet is the request packet 60 is described above. The operation performed when the received packet is the reply packet 70 will be described hereinafter.

In the step S52, the data generating section 112 sets the return pointer 72. Specifically, the data generating section 112 increments the return pointer 72.

In a step S53, the destination device information 71 is set. Specifically, the data generating section 112 sets the device number of a communication device (one of the information acquisition devices 10 or the information collection device 20) corresponding to the transmission channel unit indicated by the return pointer 72 set in the step S52 as the destination device information 71.

In the next step S54, the data analyzing section 111 determines an optimum communication scheme (referred to also as a "sending communication scheme") for use in sending the reply packet 70. Specifically, the communication scheme corresponding to the transmission channel unit indicated by the return pointer 72 incremented in the aforementioned step S52 is determined as the optimum communication scheme for use in sending the reply packet 70.

In a step S55, the reply packet 70 is sent using the optimum communication scheme determined in the step S54. Specifically, when the optimum communication scheme is the radio communication using a radio wave at a frequency of 950 MHz, the reply packet 70 is sent via the communication using the first radio communication section 101, that is, via the radio communication using a radio wave at a frequency of 950 MHz. Also, when the optimum communication scheme is the radio communication using a radio wave at a frequency of 430 MHz, the reply packet 70 is sent via the communication using the second radio communication section 102, that is, via the radio communication using a radio wave at a frequency of 430 MHz.

The step S56 to which the operating step proceeds from the step S24 (with reference to FIG. 7) is executed in an information acquisition device 10 serving as a source which sends the reply packet 70.

In the step S56, the data generating section 112 generates the reply packet 70 for the return communication. Specifically, the data generating section 112 acquires the amount of power consumption from the electric power measurement section 103 in accordance with the details of the request command 63 in the request packet 60 to generate the reply packet 70 in which the acquired amount of power consumption is recorded as the reply detail information 74. Also, the data generating section 112 initializes the transmission channel information 75 of the reply packet 70 by making a copy of the transmission channel information 64 (with reference to FIG. 5) of the request packet 60 in reverse order as mentioned above, and initializes the return pointer 72 (with reference to FIG. 6) to "0". After the execution of the step S56, the operating step proceeds to the step S53.

In the return communication process, the destination of the reply packet 70 determined based on the forward transmission channel information, more specifically the transmission channel information of the request packet (referred to also as a "corresponding request packet") 60 corresponding to the reply packet 70, in the step S53 is a source communication device which has sent the corresponding request packet 60 received by the information acquisition device 10 in this manner.

Also, the optimum communication scheme determined based on the forward transmission channel information, more specifically the transmission channel information of the corresponding request packet 60, in the step S54 is a communication scheme used for the reception of the corresponding request packet 60 in the information acquisition device 10.

In other words, the reply packet 70 is sent to the communication device which has sent the corresponding request packet 60 as a destination by using a communication scheme identical with that used for the reception of the corresponding request packet 60.

Figure 9:
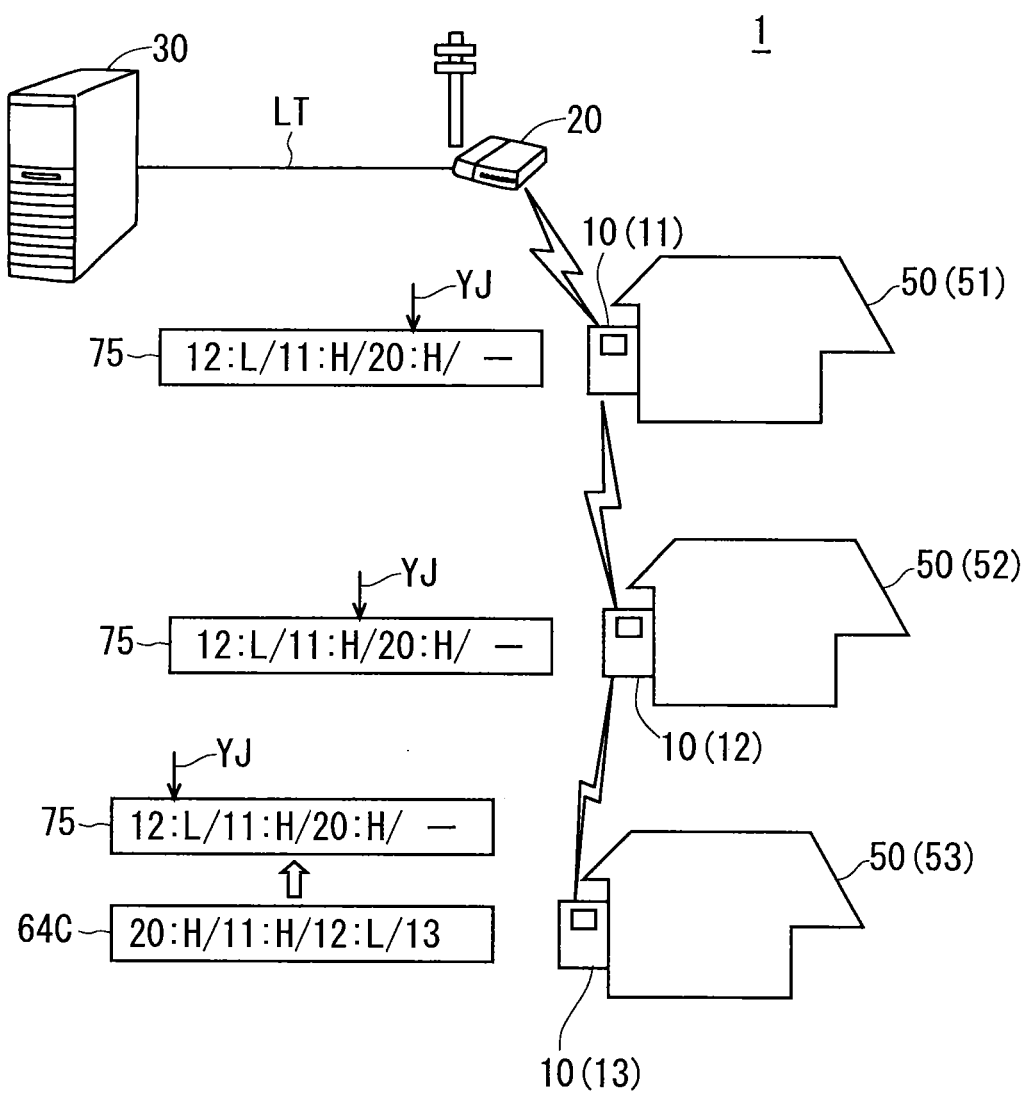
FIG. 9 illustrates an example of the transmission of the reply packet.

An example of the transmission of the reply packet 70 will be described. FIG. 9 illustrates an example of the transmission of the reply packet 70. It should be noted that FIG. 9 shows that the reply packet 70 is transmitted from the information acquisition device 13 to the information collection device 20, based on the example of the transmission of the request packet 60 shown in FIG. 5.

According to the example of the transmission of FIG. 5, information indicating "20:H/11:H/12:L/13" is recorded in the transmission channel information 64C of the request packet 60 received by the information acquisition device 13. Thus, the data generating section 112 of the information acquisition device 13 records information indicating "12:L/11:H/20:H" obtained by reversing the order in which the transmission channel units are arranged except information about its own device (in this case, the information acquisition device 13) as the transmission channel information 75 of the reply packet 70 (with reference to FIG. 9). Also, the information acquisition device 13 initializes the return pointer 72 to "0". Thus, the return pointer 72 indicates the leading transmission channel unit "12:L". It should be noted that the return pointer 72 is schematically indicated by arrows YJ in FIG. 9 for ease of understanding.

Based on the transmission channel unit "12:L" indicated by the return pointer 72, the information acquisition device 13 sets the information acquisition device 12 as the destination (the step S53), and thereafter sends the reply packet 70 via the radio communication using a radio wave at a frequency of 430 MHz (the steps S54 and S55).

Upon receipt of the reply packet 70 from the information acquisition device 13, the information acquisition device 12 increments the return pointer 72 of the received reply packet 70 (the step S52). Based on the transmission channel unit "11:H" indicated by the return pointer 72, the information acquisition device 12 sends the reply packet 70 to the information acquisition device 11 via the radio communication using a radio wave at a frequency of 430 MHz (the steps S53, S54 and S55).

Upon receipt of the reply packet 70 from the information acquisition device 12, the information acquisition device 11 increments the return pointer 72 of the received reply packet 70 (the step S52). Based on the transmission channel unit "20:H" indicated by the return pointer 72, the information acquisition device 11 sends the reply packet 70 to the information collection device 20 via the radio communication using a radio wave at a frequency of 950 MHz (the steps S53, S54 and S55).

For the return communication, when the received request packet 60 is first received in an information acquisition device 10, the information acquisition device 10 generates the reply packet 70 to the request packet 60 in this manner. Then, the information acquisition device 10 which has generated the reply packet 70 sends the reply packet 70 to the communication device which has sent the corresponding request packet 60 as a destination by using a communication scheme identical with that used for the reception of the corresponding request packet 60.

Upon receipt of the reply packet 70, an information acquisition device 10 determines a communication scheme for use in relaying (transferring) the received reply packet 70 and a destination, based on the transmission channel information 75 in the reply packet 70, to relay the reply packet 70 in accordance with the determined communication scheme and the determined destination.

[Overall Operation]

Next, the overall operation of the communication system 1 when collecting the facility information will be described. FIG. 10 illustrates the overall operation of the communication system 1. An instance where the facility information acquired by the information acquisition device 13 is transmitted to the information collection device 20 as shown in FIG. 10 will be taken as an example for description of the overall operation.

As mentioned above, each of the information acquisition devices 10 constituting the communication system 1 has the multi-hop communication function. Thus, the request packet 60 generated in the information collection device 20 is transmitted directly from the information collection device 20 to an information acquisition device 10 or indirectly via another information acquisition device.

Thus, in the case where the information collection device 20 and the information acquisition devices 11, 12 and 13, for example, are disposed in a positional relationship as shown in FIG. 10, there is a likelihood that the request packet 60 from the information collection device 20 is transmitted through a path CK1, a path CK2 or another path (not shown) to the information acquisition device 13.

In the communication system 1, the request packet 60 is sent at the same time using a radio wave at a relatively high frequency (in this case, 950 MHz) and a radio wave at a relatively low frequency (in this case, 430 MHz). Thus, there is a likelihood that two transmission channels are included in each of the aforementioned paths CK1 and CK2.

In general, the radio communication using a radio wave at a relatively high frequency achieves an improvement in communication speed over the radio communication using a radio wave at a relatively low frequency. On the other hand, the radio communication using a radio wave at a relatively low frequency achieves an increase in distance over which communication can be made and an improvement in resistance to communication environments over the radio communication using a radio wave at a relatively high frequency.

For the path CK1 where the radio communication is performed over a relatively short distance by the relaying of the plurality of information acquisition devices 10, there is therefore a high likelihood that the request packet 60 is transmitted using a radio wave at a relatively high frequency. For the path CK2 where the distance between the information collection device 20 and the information acquisition device 13 is relatively long, on the other hand, there is a high likelihood that the request packet 60 is transmitted using a radio wave at a relatively low frequency.

In this manner, the simultaneous sending of the request packet 60 using two radio waves having different characteristics ensures the optimum transmission channel in accordance with communication conditions such as the length of a communication path and the presence/absence of obstacles in the communication path to achieve the transmission of the request packet 60.

Additionally, the radio communication using a radio wave at a relatively low frequency achieves the reduction in power consumption, as compared with the radio communication using a radio wave at a relatively high frequency. When the request packet 60 is sent at the same time using a radio wave at a relatively high frequency and a radio wave at a relatively low frequency, there is a high likelihood that a radio wave at a relatively low frequency having a long distance over which communication can be made is used for the radio communication over a relatively long distance. Thus, the power consumption of the communication system 1 is suppressed when a radio wave at a relatively low frequency is used for the radio communication over a relatively long distance.

In the communication system 1, there is a likelihood that the request packets 60 are transmitted to the information acquisition devices 10 through a plurality of different transmission channels. Each of the information acquisition devices 10 performs the reply process on the first received one (corresponding request packet) of the request packets 60 received by each of the information acquisition devices 10 through the different transmission channels.

It is assumed in this case that the path CK1 in FIG. 10 is a transmission channel DR1 using a radio wave at a relatively high frequency, and the path CK2 is a transmission channel DR2 using a radio wave at a relatively low frequency. For example, when receiving the request packet 60 first through the transmission channel DR1 included among the aforementioned transmission channels DR1 and DR2, the information acquisition device 13 performs the reply process on the request packet 60 received through the transmission channel DR1. When receiving the request packet 60 first through the transmission channel DR2 included among the aforementioned transmission channels DR1 and DR2, the information acquisition device 13 performs the reply process on the request packet 60 received through the transmission channel DR2.

Each of the information acquisition devices 10 generates the reply packet 70 including the facility information in the reply process, that is, in the return communication process. In the communication system 1, the reply packet 70 generated in each of the information acquisition devices 10 is transmitted in reverse order through the transmission channel of the corresponding request packet 60 to the information collection device 20. That is, the transmission channel of the reply packet 70 is the reverse of the transmission channel of the corresponding request packet 60.

For example, the reply packet 70 generated in response to the request packet 60 received through the transmission channel DR1 is transmitted to the information collection device 20 through a transmission channel obtained by following the transmission channel DR1 in reverse order. The reply packet 70 generated in response to the request packet 60 received through the transmission channel DR2 is transmitted to the information collection device 20 through a transmission channel obtained by following the transmission channel DR2 in reverse order.

The corresponding request packet 60 is the request packet 60 first received by each of the information acquisition devices 10. Thus, the transmission channel of the corresponding request packet 60 can be said to be an optimum transmission channel between the information acquisition device 10 serving as a source from which the reply packet 70 is sent and the information collection device 20.

In this manner, the communication system 1 sends the reply packet 70 through the optimum transmission channel to the information collection device 20. This achieves an improvement in the reliability of the radio communication in the communication system 1.

As described hereinabove, the communication system 1 includes the information acquisition devices 10 having the facility information, and the information collection device 20 for collecting the facility information from the information acquisition devices 10. Each of the information acquisition devices 10 and the information collection device 20 includes a first communication means for performing radio communication, and a second communication means for performing radio communication using a radio signal different in frequency band from that used by the radio communication performed by the first communication means. The information collection device 20 requests the information acquisition devices 10 to send the facility information by using the first communication means and the second communication means of the information collection device 20. Each of the information acquisition devices 10 includes the communication scheme specifying section 110 for specifying which one of the first and second communication means in each of the information acquisition devices 10 has first received the request to send from the information collection device 20, and the communication control section 113 for making a reply to the request to send by using the communication means specified by the communication scheme specifying section 110.

Such a communication system 1 is capable of performing communication using the optimum transmission channel in accordance with the conditions of communication between the devices. This achieves an improvement in the reliability of the radio communication in the communication system 1.

MODIFICATIONS

While the embodiment according to the present invention has been described hereinabove, the present invention is not limited to the aforementioned description.

For example, the two frequencies for use in radio communication illustrated in the aforementioned embodiment include, but are not limited to, a pair comprised of a frequency of 950 MHz and a frequency of 430 MHz.

Examples of the pair of frequencies may include a pair comprised of a frequency of 2.4 GHz and a frequency of 430 MHz, a pair comprised of a frequency of 950 MHz and a frequency of 280 MHz, and a pair comprised of a frequency of 430 MHz and a frequency of 280 MHz.

Although the radio communication is performed using two radio waves different in frequency band from each other in the aforementioned embodiment, the present invention is not limited to this. The radio communication may be performed using three or more radio waves different in frequency band from each other. In this manner, the increase in the number of radio waves for use in radio communication achieves further increase in a likelihood of ensuring the transmission channel between the devices. This further improves the reliability of communication.

In the aforementioned embodiment, the first radio communication sections 101 and 201 and the second radio communication sections 102 and 202 in the information acquisition devices 10 and the information collection device 20 are illustrated as performing radio communication using radio signals different in frequency band from each other. The present invention, however, is not limited to this.

Specifically, the first radio communication sections 101 and 201 and the second radio communication sections 102 and 202 in the information acquisition devices 10 and the information collection device 20 may use modulation schemes different from each other to perform radio communication.

The modulation schemes are of the following types: digital modulation schemes such as frequency modulation (FSK) and OFDM; and spread spectrum schemes such as frequency hopping and direct spread. In the communication system 1, different ones of these modulation schemes may be used to perform radio communication. As an example of the combination, the frequency modulation may be used in the first radio communication sections 101 and 201, whereas the OFDM be used in the second radio communication sections 102 and 202. As an alternative example, the OFDM may be in the first radio communication sections 101 and 201, whereas the direct spread be used in the second radio communication sections 102 and 202.

These modulation schemes have different characteristics for communication environments. Thus, the first radio communication sections 101 and 201 and the second radio communication sections 102 and 202 use different modulation schemes to perform radio communication, thereby achieving the transmission of information through the optimum transmission channel in accordance with the communication environments.

In the aforementioned embodiment, it is expressed that radio communication is performed using radio signals in frequency bands different from each other in the information acquisition devices 10 and the information collection device 20. The different frequency bands as used herein express that the two frequency bands do not overlap each other in principle. In the case where the spread spectrum schemes are employed as the modulation schemes in the first radio communication sections 101 and 201 and in the second radio communication sections 102 and 202, two radio signals are distinguishably decodable if the frequency bands of the two radio signals partially overlap each other but the center frequencies thereof are different from each other. Thus, a partial overlap between the frequency bands of the two radio signals is allowed in the case where the spread spectrum schemes are employed in the first radio communication sections 101 and 201 and in the second radio communication sections 102 and 202. In other words, in the case where the spread spectrum schemes are employed in the first radio communication sections 101 and 201 and in the second radio communication sections 102 and 202, the aforementioned different frequency bands as used herein mean an expression including the fact that the frequency bands do not overlap each other and the fact that the frequency bands partially overlap each other.

In the aforementioned embodiment, it is expressed that radio communication is performed using radio signals different in frequency band from each other in the information acquisition devices 10 and the information collection device 20. However, it may be expressed that radio communication is performed using carrier waves different in frequency from each other. In the case where the OFDM is used as the modulation scheme, the aforementioned carrier waves do not refer to subcarriers obtained by division, but mean virtual carriers in a frequency band including all subcarriers.

In the communication system 1 in the aforementioned embodiment, the request packet 60 and/or the reply packet 70 may be encrypted and thereafter transmitted. This enhances the confidentiality of the transmitted data.

While the invention has been described in detail, the foregoing description is in all aspects illustrative and not restrictive. It is understood that numerous other modifications and variations which have not been illustrated can be devised without departing from the scope of the invention.

The invention claimed is:

1. A communication system comprising:
at least one first communication device having predetermined information; and
a second communication device for collecting said predetermined information from said at least one first communication device,
each of said at least one first communication device and said second communication device including:
a first communication means for performing radio communication, and
a second communication means for performing radio communication using a radio signal different in frequency band from that used by the radio communication performed by said first communication means,
said second communication device requesting said at least one first communication device to send said predetermined information by using said first communication means and said second communication means of said second communication device,
said at least one first communication device further including:
a specifying means for specifying which one of the first communication means and the second communication means in said at least one first communication device has first received said request to send, and
a communication control means for making a reply to said request to send by using the communication means specified by said specifying means.

2. The communication system according to claim 1, wherein
said at least one first communication device includes a plurality of first communication devices, and
upon receipt of said request to send, said at least one first communication device relays said request to send by using said first communication means and said second communication means of said at least one first communication device.

3. The communication system according to claim 2,
wherein, when relaying send data including said request to send, said at least one first communication device records the communication means specified by said specifying means and the relay of said at least one first communication device as transmission channel information of said send data in said send data,
said communication system transmitting reply data in response to said request to send to said second communication device through a transmission channel determined based on said transmission channel information.

4. The communication system according to claim 3,
wherein, when generating said reply data, said at least one first communication device records transmission channel information of the reply data in the reply data, based on the transmission channel information of said send data,
said communication system transmitting said reply data to said second communication device through a transmission channel that is the reverse to the transmission channel of said send data in accordance with the transmission channel information of said reply data.

5. The communication system according to claim 1,
wherein said first communication means and said second communication means in each of said at least one first communication device and said second communication device perform radio communication using modulation schemes different from each other.

6. A communication device that performs radio communication with another communication device, said communication device comprising:
a first communication means for performing radio communication; and
a second communication means for performing radio communication using a radio wave different in frequency band from that used by the radio communication performed by said first communication means,
wherein said another communication device includes:
a third communication means for performing radio communication with said first communication means, and
a fourth communication means for performing radio communication with said second communications means, and
wherein said communication device further comprises:
a specifying means for specifying which one of said first communication means and said second communication means has first received a request to send predetermined information, said request being performed by said another communication device using said third communication means and said fourth communications means; and a communication control means for making a reply to said request to send by using the communication means specified by said specifying means.

7. A communication system comprising:

at least one first communication device having predetermined information; and a second communication device configured to collect said predetermined information from said at least one first communication device, each of said at least one first communication device and said second communication device including:

first radio communication circuitry configured to perform radio communication, and second radio communication circuitry configured to perform radio communication using a radio signal different in frequency band from that used by the radio communication performed by said first radio communication circuitry, said second communication device requesting said at least one first communication device to send said predetermined information by using said first radio communication circuitry and said second radio communication circuitry of said second communication device, said at least one first communication device further including:

circuitry configured to specify which one of the first radio communication circuitry and the second radio communication circuitry in said at least one first communication device has first received said request to send, and communication control circuitry configured to make a reply to said request to send by using the first or second radio communication circuitry specified by said circuitry.

8. The communication system according to claim 7, wherein said at least one first communication device includes a plurality of first communication devices, and upon receipt of said request to send, said at least one first communication device relays said request to send by using said first radio communication circuitry and said second radio communication circuitry of said at least one first communication device.

9. The communication system according to claim 8, wherein, when relaying send data including said request to send, said at least one first communication device records the first or second radio communication circuitry specified by said circuitry and the relay of said at least one first communication device as transmission channel information of said send data in said send data, said communication system transmitting reply data in response to said request to send to said second communication device through a transmission channel determined based on said transmission channel information.

10. The communication system according to claim 9, wherein, when generating said reply data, said at least one first communication device records transmission channel information of the reply data in the reply data, based on the transmission channel information of said send data, said communication system transmitting said reply data to said second communication device through a transmission channel that is the reverse to the transmission channel of said send data in accordance with the transmission channel information of said reply data.

11. The communication system according to claim 7, wherein said first radio communication circuitry and said second radio communication circuitry in each of said at least one first communication device and said second communication device perform radio communication using modulation schemes different from each other.

* * * * *